(12) United States Patent
Hemmi et al.

(10) Patent No.: US 7,451,842 B2
(45) Date of Patent: Nov. 18, 2008

(54) CONTROL SYSTEM FOR ELECTRIC MOTOR CAR

(75) Inventors: Takuma Hemmi, Kanagawa (JP); Tetsu Tone, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 148 days.

(21) Appl. No.: 11/429,324

(22) Filed: May 8, 2006

(65) Prior Publication Data

US 2007/0002995 A1 Jan. 4, 2007

(30) Foreign Application Priority Data

May 18, 2005 (JP) ............................ P2005-145508

(51) Int. Cl.
*B60K 1/00* (2006.01)
(52) U.S. Cl. ..................................... 180/65.1; 180/65.8
(58) Field of Classification Search ................ 180/65.1, 180/65.2, 65.5, 65.6, 65.8; 318/139, 106, 318/67, 82, 758
See application file for complete search history.

(56) References Cited

U.S. PATENT DOCUMENTS

| | | | | |
|---|---|---|---|---|
| 3,903,465 A | * | 9/1975 | Ibamoto et al. | ............. 318/139 |
| 4,472,663 A | * | 9/1984 | Melocik | ....................... 318/82 |
| 4,961,042 A | * | 10/1990 | Imaseki | ....................... 318/758 |
| 5,638,387 A | * | 6/1997 | Palleggi et al. | ................ 318/67 |
| 5,646,513 A | * | 7/1997 | Riggio, Jr. | ................... 323/285 |
| 5,670,851 A | * | 9/1997 | Numazaki | .................... 318/106 |
| 5,723,956 A | * | 3/1998 | King et al. | ................... 318/139 |
| 5,977,742 A | * | 11/1999 | Henmi | ....................... 318/801 |
| 6,023,137 A | * | 2/2000 | Kumar et al. | ............... 318/139 |
| 6,755,267 B2 | * | 6/2004 | Yamada et al. | ............. 180/65.8 |
| 7,100,717 B2 | * | 9/2006 | Stancu et al. | .............. 180/65.1 |

FOREIGN PATENT DOCUMENTS

JP 2003-199204 7/2003

* cited by examiner

*Primary Examiner*—Hau V Phan
(74) *Attorney, Agent, or Firm*—Finnegan, Henderson, Farabow, Garrett & Dunner, L.L.P.

(57) ABSTRACT

A control system for centrally controlling information related to an electric motor car and effectively using power for the electric motor car involves a VVVF inverter, a CVCF inverter, a fuel cell, a power storage unit, and a power management unit that centrally controls power of the electric motor car. When the electric motor car carries out a regenerative braking operation, the power management unit makes the VVVF inverter convert AC power regenerated by a motor into DC power and makes the power storage unit and CVCF inverter store and consume the converted DC power. When the electric motor car carries out a power running operation, the power management unit supplies power from the fuel cell and power storage unit and supplemental power from an overhead line to the VVVF inverter and CVCF inverter. When the electric motor car carries out a coasting operation, the power management unit supplies power from the fuel cell and power storage unit and supplemental power from the overhead line to the CVCF inverter.

13 Claims, 10 Drawing Sheets

CONTROL SYSTEM FOR ELECTRIC MOTOR CAR

CROSS-REFERENCE TO RELATED APPLICATION

This application is based upon and claims the benefit of priority from the prior Japanese Patent Application No. 2005-145508, filed on May 18, 2005. The entire contents of which are incorporated herein by reference.

BACKGROUND OF THE INVENTION

1. Field of the Invention

The present invention relates to a control system for an electric motor car.

2. Description of Related Art

An electric motor car has a regenerative brake that regenerates electric power during braking. The regenerated power is supplied for consumption to a power source unit of the same electric motor car or to another electric motor car through an overhead line. Power consumption by the power source unit of the same electric motor car is not always large, the power supplied to the other electric motor car is not always entirely consumed, or there is no other electric motor car. In these cases, power regeneration must be decreased by increasing mechanical frictional braking power and by wasting energy. When there are no other electric motor cars to consume regenerated power, the resistance of a brake chopper system may be used to convert the power into heat.

In this way, the regenerative brake system is not effectively used when energy demand is low due to the conditions of other electric motor cars or railroad tracks. If energy demand is low, the regenerative brake system must reduce regenerative power or convert regenerative power into heat. To effectively use regenerated energy, a related art disclosed in Japanese Unexamined Patent Application Publication No. 2003-199204 stores regenerated energy in an electric double layer capacitor.

SUMMARY OF THE INVENTION

An object of the present invention is to improve the electric motor car control system of the related art and provide a control system for an electric motor car, capable of consuming electric power in a drive unit during power running of the electric motor car, and during regenerative braking, supplying power from the drive unit to a power source unit and a power storage unit. The control system employs a power management unit to collect information from related units and issue instructions to the related units, thereby centrally controlling and effectively handling regenerative power.

In order to accomplish the object, a first aspect of the present invention provides a control system for an electric motor car, comprising: a variable-voltage variable-frequency (VVVF) inverter configured to receive DC power from an overhead line or a third rail, convert the received DC power into AC power under variable-voltage, variable-frequency control, and supply the AC power to an AC motor; a constant-voltage constant-frequency (CVCF) inverter configured to receive the DC power and supply constant-voltage, constant-frequency power to auxiliary devices of the electric motor car; a power generation unit configured to supply power to the VVVF inverter and the CVCF inverter; a power storage unit configured to store power from the power generation unit and the VVVF inverter; and a power management unit configured to centrally control power consumption and power supply.

The power management unit conducts: power consumption control when the electric motor car carries out a regenerative braking operation, so that the VVVF inverter converts regenerated AC power of the AC motor into DC power, and the power storage unit and the CVCF inverter store and consume the converted DC power; power supply control when the electric motor car carries out a power running operation, so that power from the power generation unit and the power storage unit and supplemental power thereof from the overhead line or the third rail are supplied to the VVVF inverter and the CVCF inverter; and power supply control when the electric motor car carries out a coasting operation, so that power from the power generation unit and the power storage unit and supplemental power thereof from the overhead line or the third rail are supplied to the CVCF inverter.

In this way, the control system according to the above-mentioned aspect consumes power with the drive unit if the electric motor car carries out a power running operation, and supplies power from the drive unit to the power source unit and the power storage unit if the electric motor car carries out a regenerative braking operation.

DETAILED DESCRIPTION OF EMBODIMENTS

Figure 1:
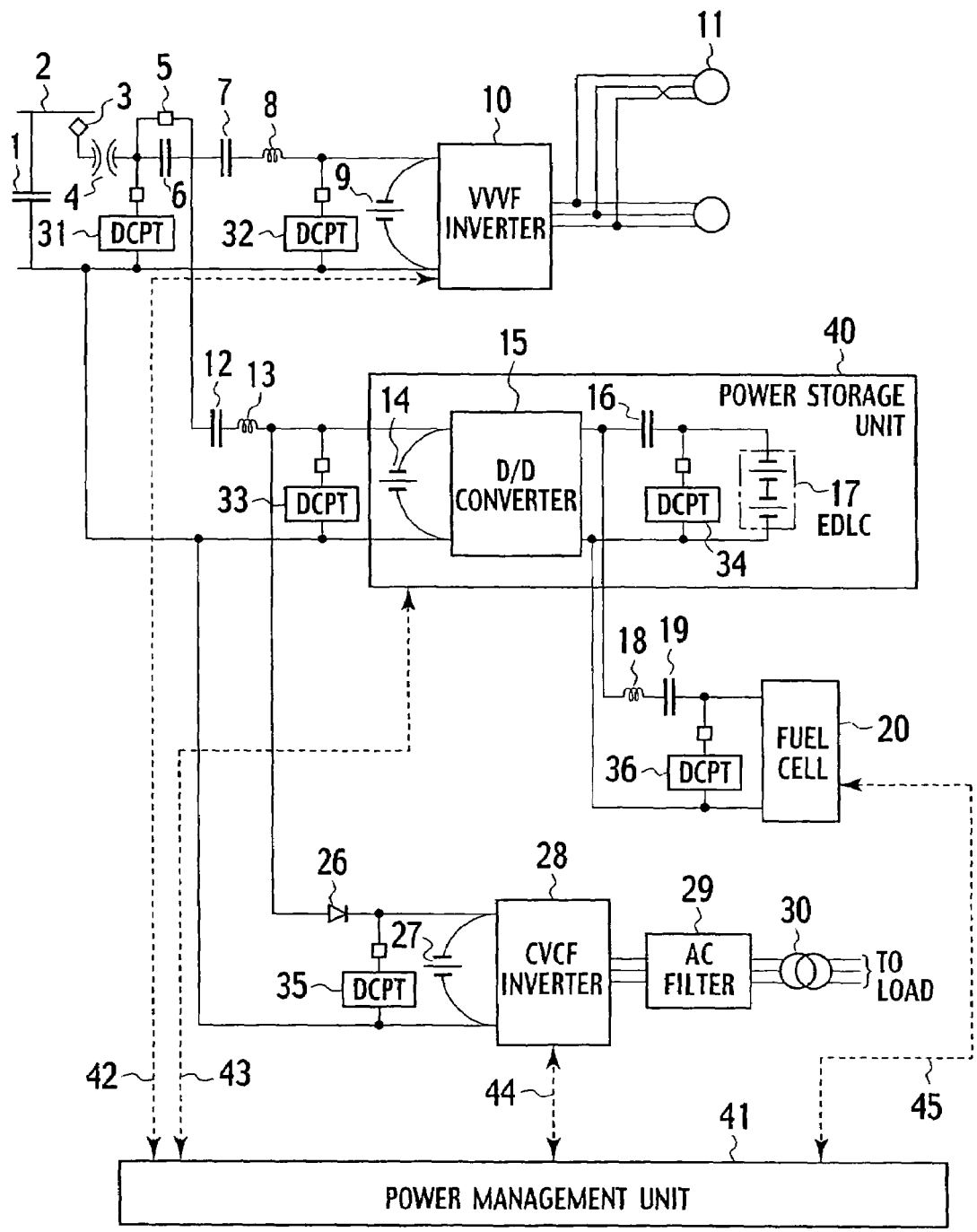
FIG. 1 is a block diagram showing a control system for an electric motor car according to a first embodiment of the present invention.

Embodiments of the present invention will be explained in detail with reference to the drawings. FIG. 1 is a block diagram showing a control system for an electric motor car according to the first embodiment of the present invention. According to the first embodiment, the electric motor car is a DC electric motor car. The DC electric motor car includes a pantograph 3 to receive DC power through an overhead line 2 from a DC power source 1, a high-speed circuit breaker 4, a charging resistor 5, a charging resistor closing contactor 6, a contactor 7, and an input filter circuit consisting of a filter reactor 8 and a filter capacitor 9. The filter capacitor 9 is connected to a voltage detector (DC potential transformer) 32 and a three-phase VVVF inverter 10. The VVVF inverter 10 is connected to an induction motor 11.

The electric motor car has another power source system including a contactor 12 and an input filter circuit, which includes a D/D converter filter reactor 13 and D/D converter filter capacitor 14. The filter capacitor 14 is connected to a voltage detector (DC potential transformer) 33 and a D/D converter 15. The D/D converter 15 is connected to a contactor 16 and an electric double layer capacitor (EDLC) 17. These elements form a power storage unit 40. An output side of the D/D converter 15 is connected through a rush current preventive reactor 18 and a releasable contactor 19 to a fuel cell 20.

The electric motor car has still another power source system including a CVCF inverter system for converting DC power into constant-voltage, constant-frequency AC power. The CVCF inverter system includes a reverse current preventive blocking diode 26 connected in series with the filter reactor 13, as well as a filter capacitor 27. The filter capacitor 27 is connected to a voltage detector (DC potential transformer) 35 and a three-phase CVCF inverter 28. The CVCF inverter 28 is connected to an AC filter 29 and a transformer 30 to supply electric power to loads such as air conditioners and fluorescent lamps.

The control system according to the embodiment includes a power management unit 41 that is characteristic of the present invention. The power management unit 41 centrally controls power of the electric motor car through signal lines 42 to 45 connected to the VVVF inverter 10, power storage unit 40, CVCF inverter 28, and fuel cell 20, respectively.

The power management unit 41 according to the embodiment conducts (1) when the electric motor car carries out a regenerative braking operation, power control to make the VVVF inverter 10 convert regenerative AC power of the motor 11 into DC power and make the power storage unit 40 and CVCF inverter 28 store and consume the DC power, (2) when the electric motor car carries out a power running operation, power control to supply power from the power generation unit 20 and power storage unit 40 and supplemental power thereof from the overhead line 2 or a third rail to the VVVF inverter 10 and CVCF inverter 28, and (3) when the electric motor car carries out a coasting operation, power control to supply power from the power generation unit 20 and power storage unit 40 and supplemental power thereof from the overhead line 2 or third rail to the CVCF inverter 28. The power management unit 41 centrally controls these control modes (1), (2), and (3). The power management unit 41 limits maximum power from a substation and centrally controls electric energy of the electric motor car.

Figure 2:
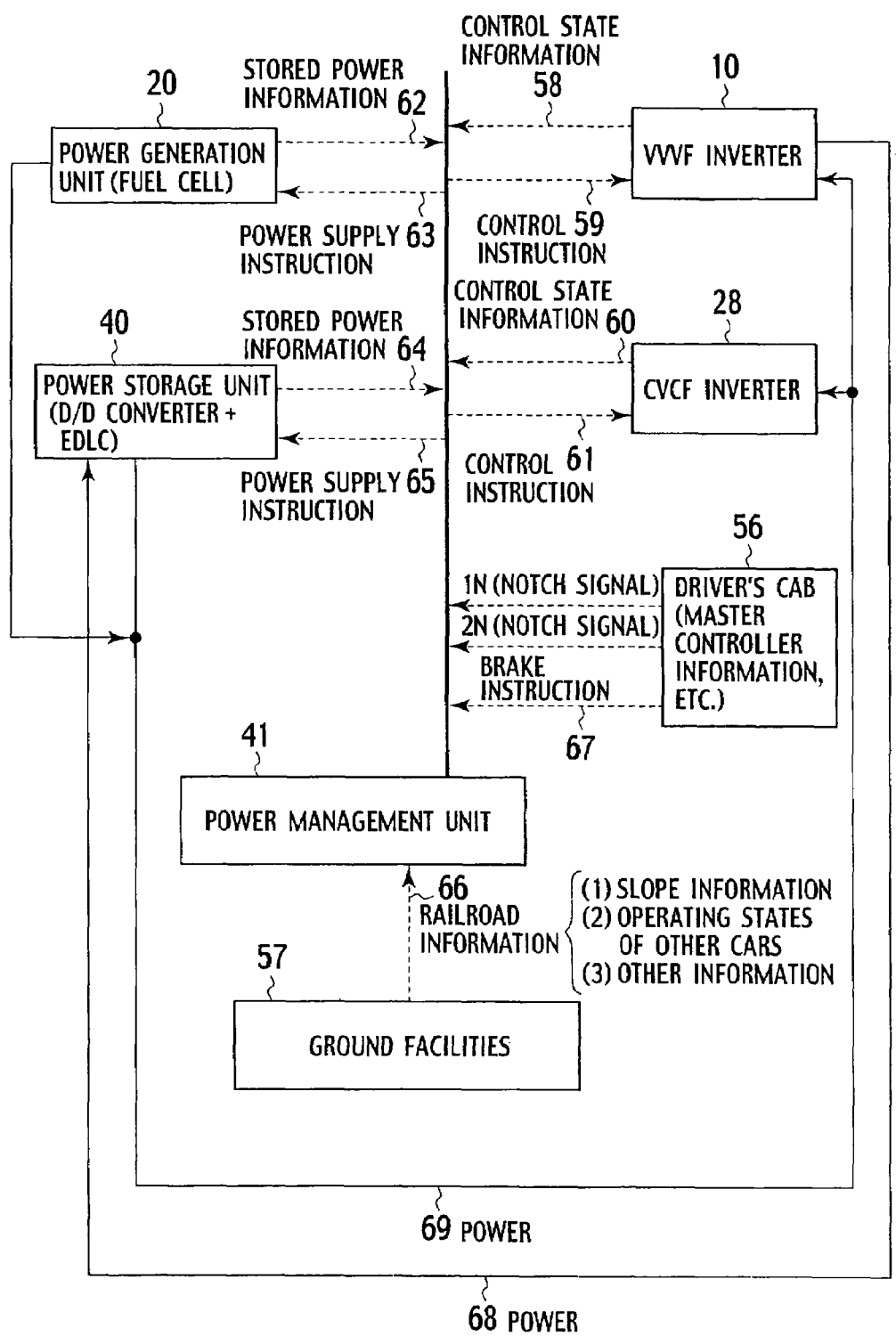
FIG. 2 is a block diagram showing information paths to and from a power management unit according to the first embodiment.

FIG. 2 shows information paths in the control system of the electric motor car according to the first embodiment of the present invention. The power management unit 41 according to the embodiment controls power supply 69 from the power generation unit, i.e., the fuel cell 20 and the power storage unit 40 including the D/D converter 15 and electric double layer capacitor 17 to the VVVF inverter 10 and CVCF inverter 28, as well as power supply 68 from the VVVF inverter 10 to the power generation unit 20 and power storage unit 40. To achieve this, the power management unit 41 collects control state information 58 from the VVVF inverter 10, control state information 60 from the CVCF inverter 28, stored power information 62 from the power generation unit 20, stored power information 64 from the power storage unit 40, railroad information 66 such as slope information, operating states of other cars, and the like from ground facilities 57, and notch and brake information 67 from a driver's cab 56. According to the collected information pieces, the power management unit 41 issues a VVVF start/stop instruction 59 to the VVVF inverter 10, a CVCF start/stop instruction 61 to the CVCF inverter 28, a power supply instruction 63 to the power generation unit 20, and a power supply instruction 65 to the power storage unit 40, so that the power generation unit 20 and power storage unit 40 supply power to the VVVF inverter 10 and CVCF inverter 28, or the VVVF inverter 10 supplies power to the power generation unit 20 and power storage unit 40.

Figure 3:
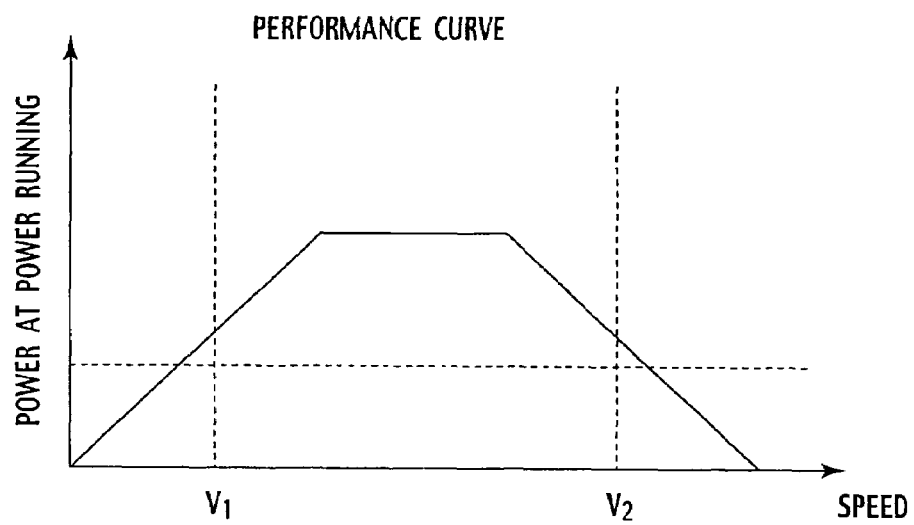
FIG. 3 is a performance curve showing a relationship between speed and power consumption of the electric motor car used by the power management unit according to the first embodiment.

This power management controls the power running and braking of the electric motor car so as to minimize power supply from the overhead line 2. FIG. 3 shows a performance curve of the electric motor car. The power management unit 41 shown in FIG. 2 receives information about a speed of the electric motor car from the driver's cab 56, calculates output according to the performance curve of FIG. 3, and activates the power generation unit 20 and power storage unit 40 if the electric motor car is power-running at a maximum output, to thereby reduce power supply from a substation.

Figure 4:
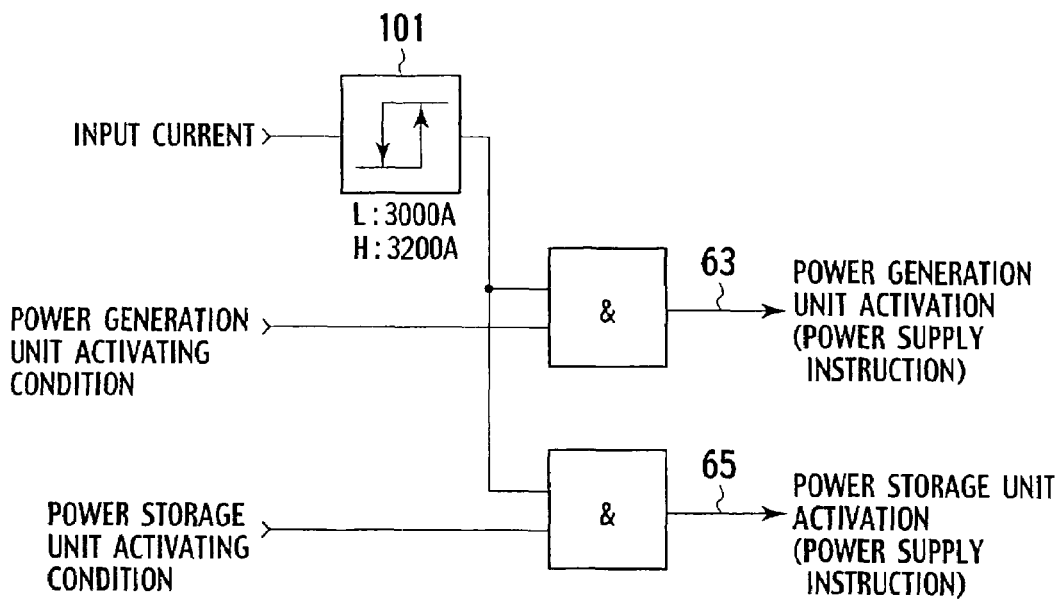
FIG. 4 shows a logic used by the power management unit when issuing instructions to a power generation unit and power storage unit based on an input current from an overhead line according to the first embodiment.

FIG. 4 shows a decision logic carried out by the power management unit 41 with respect to an input current from the overhead line 2. Based on this logic, the power management unit 41 issues the operation instruction (power supply instruction) 63 to the power generation unit 20 and the operation instruction (power supply instruction) 65 to the power storage unit 40. If the input current from the overhead line 2 is equal to or greater than a set value in an input current evaluation 101, the power management unit 41 provides an operation signal. Based on an AND of the operation signal and an activation condition of the power generation unit 20, the power management unit 41 issues the operation instruction 63 to the power generation unit 20. Based on an AND of the operation signal and an activation condition of the power storage unit 40, the power management unit 41 issues the operation instruction 65 to the power storage unit 40. The input current evaluation 101 has a hysteresis characteristic for stable operation. This control needs no power limiting control of the related art and is capable of supplying sufficient power to the electric motor car from the overhead line 2, power generation unit 20, and power storage unit 40.

Figure 5:
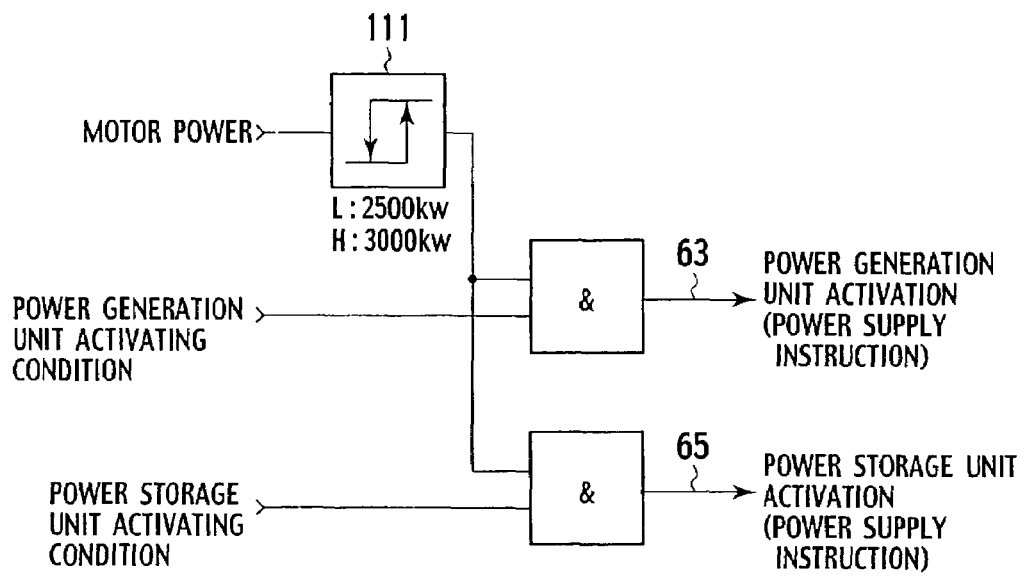
FIG. 5 shows a logic used by the power management unit when issuing instructions to the power generation unit and power storage unit based on power of a motor according to the first embodiment.

FIG. 5 shows a decision logic carried out by the power management unit 41 with respect to a power requirement of the motor 11. Based on this logic, the power management unit 41 issues the operation instruction (power supply instruction) 63 to the power generation unit 20 and the operation instruction (power supply instruction) 65 to the power storage unit 40. According to a notch instruction 67 from the driver's cab 56 and railroad information 66, the power management unit 41 calculates a power requirement of the motor 11. If the power requirement is equal to or greater than a set value in a motor power evaluation 111, the power management unit 41 provides an operation signal. Based on an AND of the operation signal and an activation condition of the power generation unit 20, the power management unit 41 issues the operation instruction 63 to the power generation unit 20. Based on an AND of the operation signal and an activation condition of the power storage unit 40, the power management unit 41 issues the operation instruction 65 to the power storage unit 40. The motor power evaluation 111 has a hysteresis characteristic for stable operation. This control eliminates the power limiting control of the related art.

Figure 6:
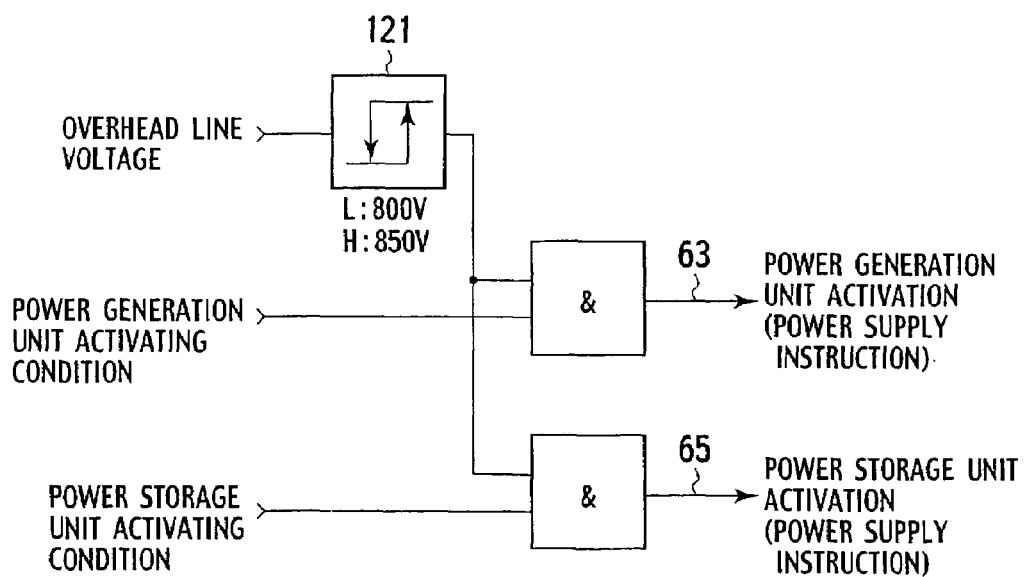
FIG. 6 shows a logic used by the power management unit when issuing instructions to the power generation unit and power storage unit based on a voltage of the overhead line according to the first embodiment.

FIG. 6 shows a decision logic carried out by the power management unit 41 with respect to a voltage of the overhead line 2. Based on this logic, the power management unit 41 issues the operation instruction (power supply instruction) 63 to the power generation unit 20 and the operation instruction (power supply instruction) 65 to the power storage unit 40. If the voltage of the overhead line 2 is equal to or greater than a set value in an overhead line voltage evaluation 121, the power management unit 41 provides an operation signal. Based on an AND of the operation signal and an activation condition of the power generation unit 20, the power management unit 41 issues the operation instruction 63 to the power generation unit 20. Based on an AND of the operation signal and an activation condition of the power storage unit 40, the power management unit 41 issues the operation instruction 65 to the power storage unit 40. The overhead line voltage evaluation 121 has a hysteresis characteristic for stable operation.

Figure 7:
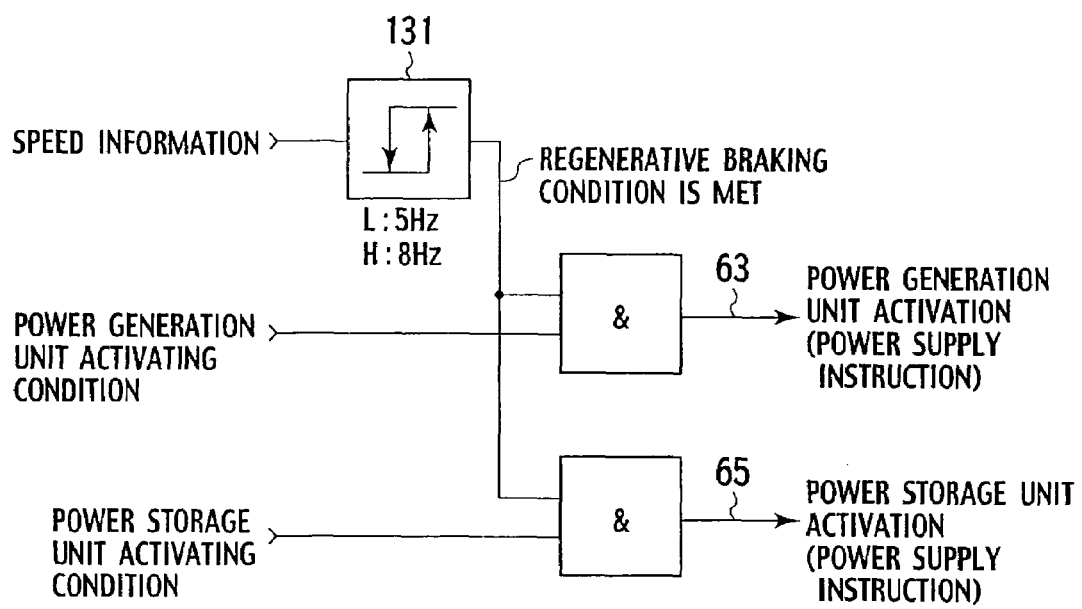
FIG. 7 shows a logic used by the power management unit when issuing instructions to the power generation unit and power storage unit based on speed of the electric motor car according to the first embodiment.

FIG. 7 shows a decision logic carried out by the power management unit 41 according to speed information of the electric motor car. Based on this logic, the power management unit 41 issues the operation instruction (power supply instruction) 63 to the power generation unit 20 and the operation instruction (power supply instruction) 65 to the power storage unit 40 to store regenerative energy. If the speed information shows that the electric motor car is in a regenerative braking range in a speed evaluation 131, the power management unit 41 provides an operation signal. Based on an AND of the operation signal and an activation condition of the power generation unit 20, the power management unit 41 issues the operation instruction 63 to the power generation unit 20. Based on an AND of the operation signal and an activation condition of the power storage unit 40, the power management unit 41 issues the operation instruction 65 to the power storage unit 40 to store regenerative energy. The speed evaluation 131 has a hysteresis characteristic for stable operation.

Figure 8:
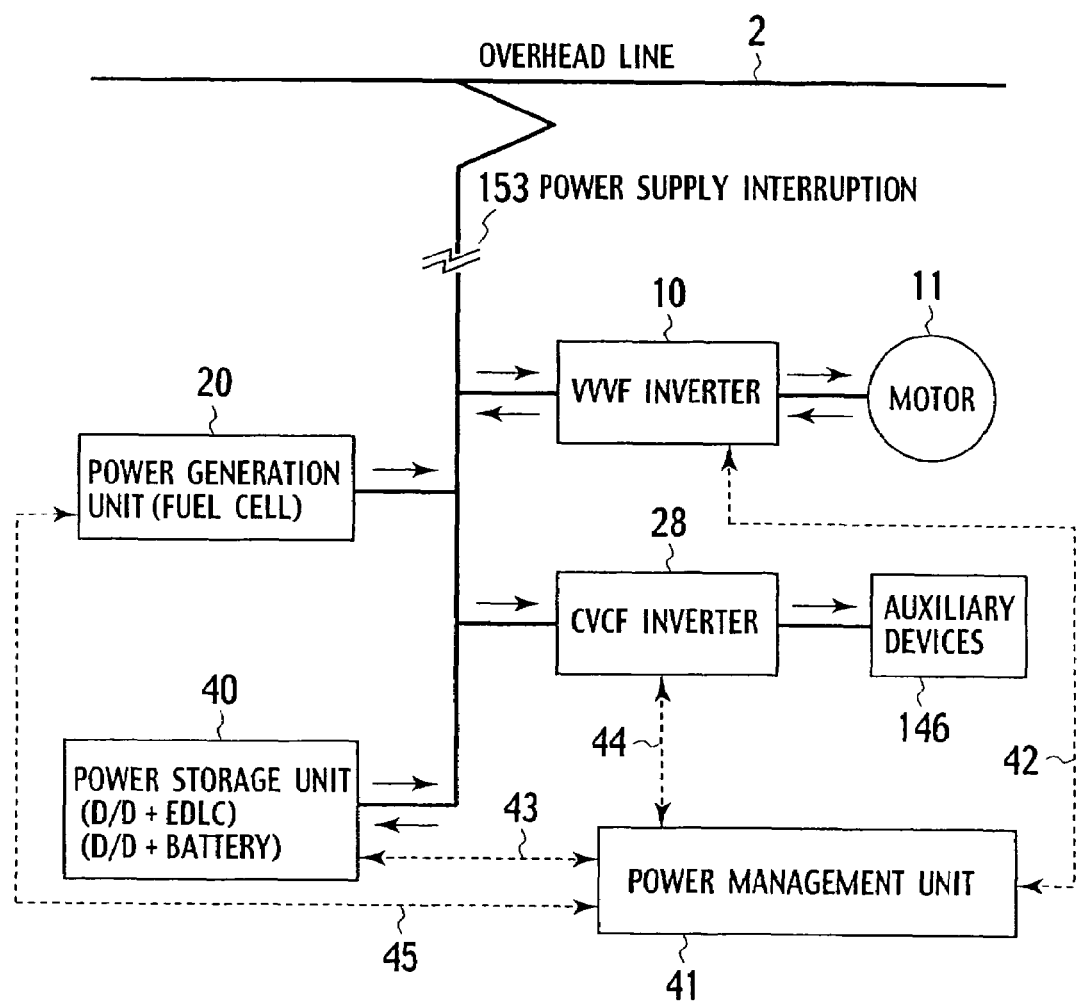
FIG. 8 is a block diagram showing power management control conducted by the power management unit when power supply from the overhead line is interrupted according to the first embodiment.

FIG. 8 shows power control carried out by the power management unit 41 when power supply from the overhead line 2 stops. If power supply from the overhead line 2 or the third rail is interrupted due to a power failure as indicated with 153 in FIG. 8, the power management unit 41 acknowledges the power interruption from overhead voltage information and activates the power generation unit 20 and power storage unit 40 to supply power through the VVVF inverter 10 and CVCF inverter 28 to the motor 11 and auxiliary devices 146 such as air conditioners and lights to continuously run the electric motor car. If the motor 11 produces regenerative energy, the power management unit 41 stores the regenerated energy in the power storage unit 40.

In this way, the power management unit 41 makes, during a power failure of the overhead line 2, the CVCF inverter 28 supply power to the auxiliary devices 146 such as compressors and lights and the VVVF inverter 10 supply power to the motor 11 so that the electric motor car runs up to the next station or a side track. Namely, during a power failure of the overhead line 2, the power management unit 41 drives the VVVF inverter 10 and CVCF inverter 28 at minimum power to prevent the electric motor car from a standstill.

Figure 9:
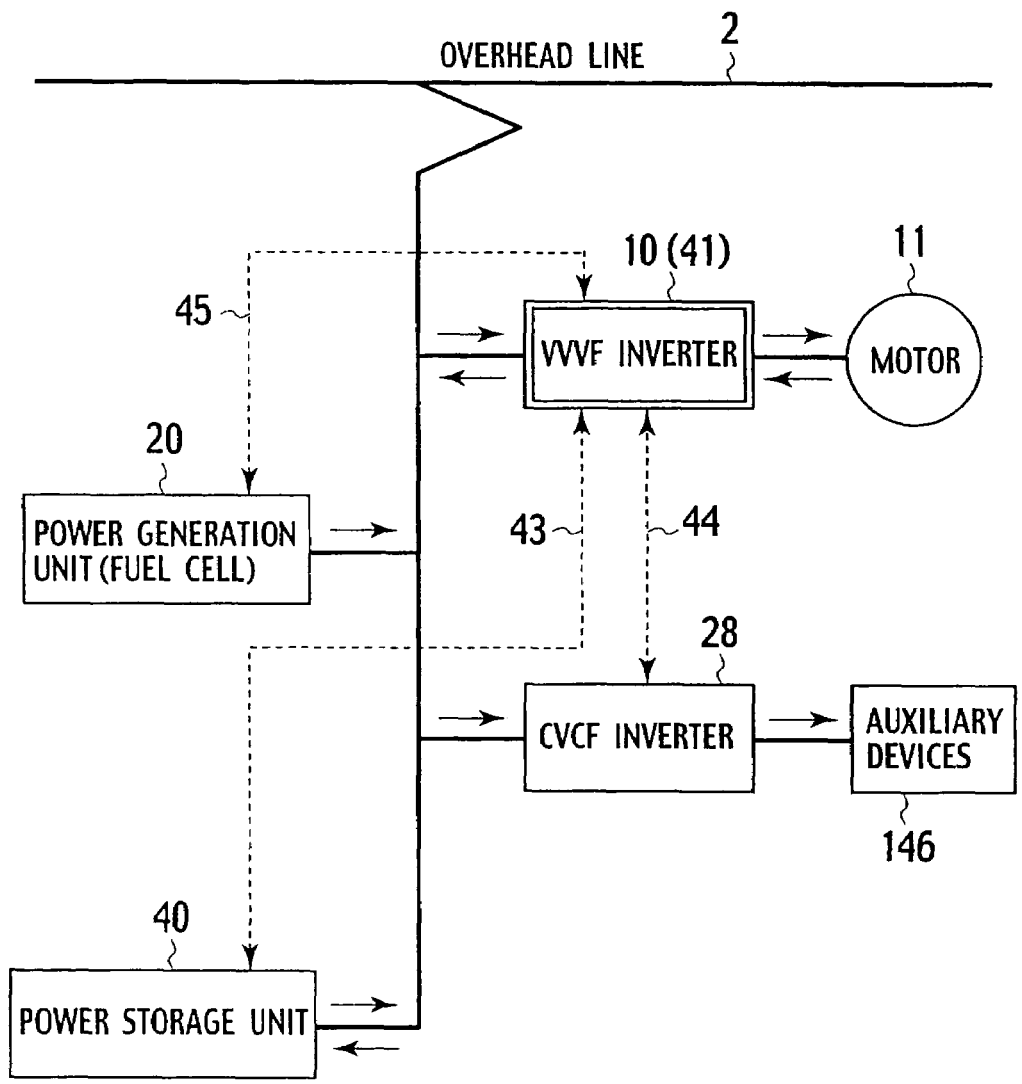
FIG. 9 is a block diagram showing information paths to and from a power management unit according to a second embodiment of the present invention.
Figure 10:
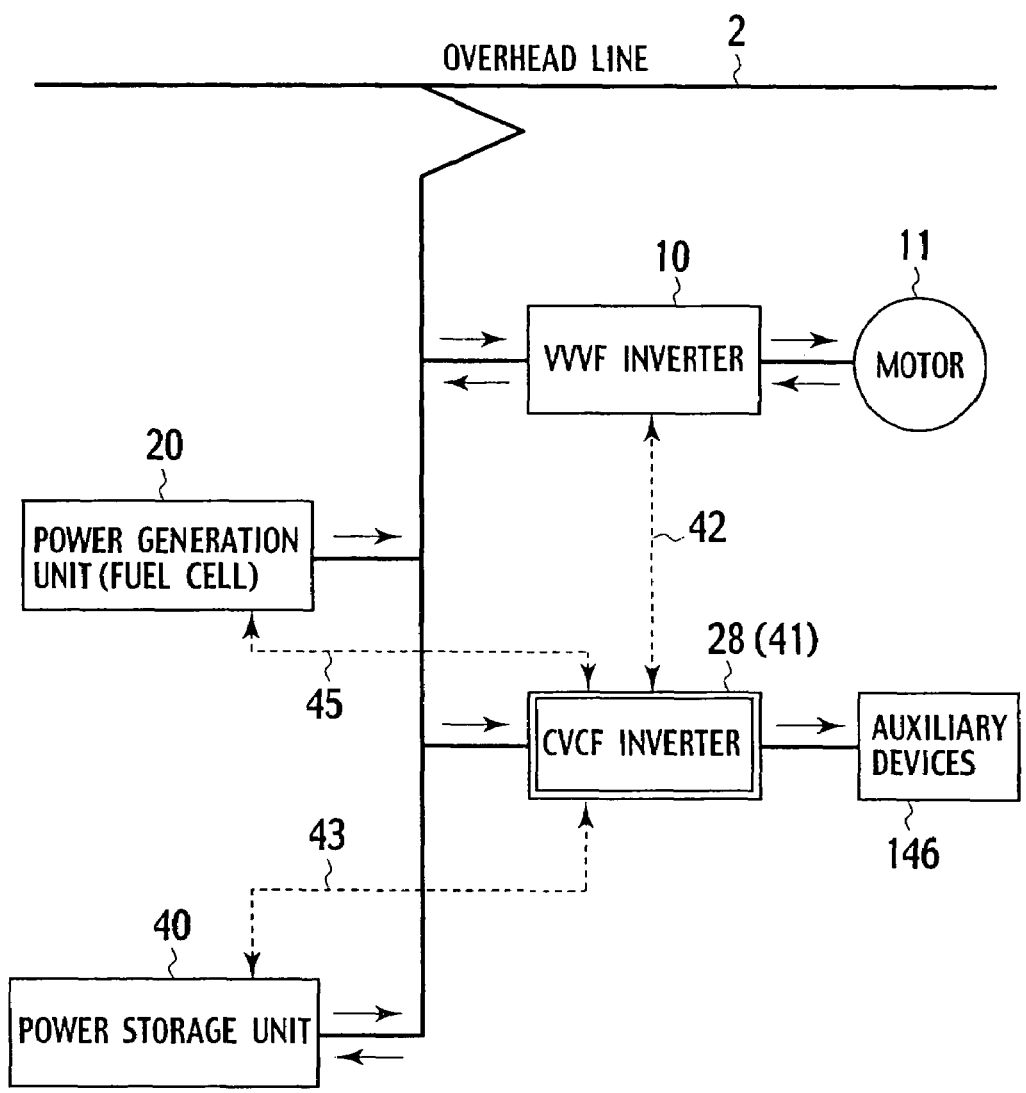
FIG. 10 is a block diagram showing information paths to and from a power management unit according to a third embodiment of the present invention.
Figure 11:
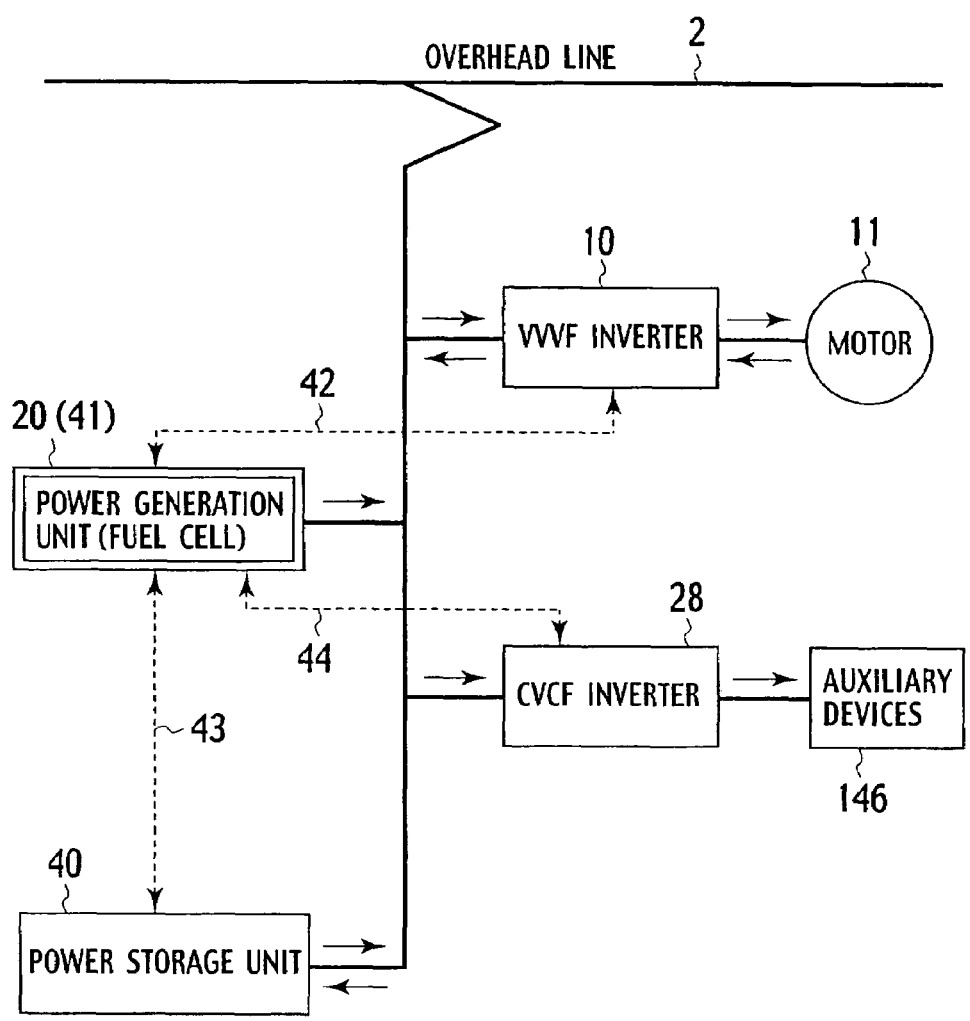
FIG. 11 is a block diagram showing information paths to and from a power management unit according to a fourth embodiment of the present invention.
Figure 12:
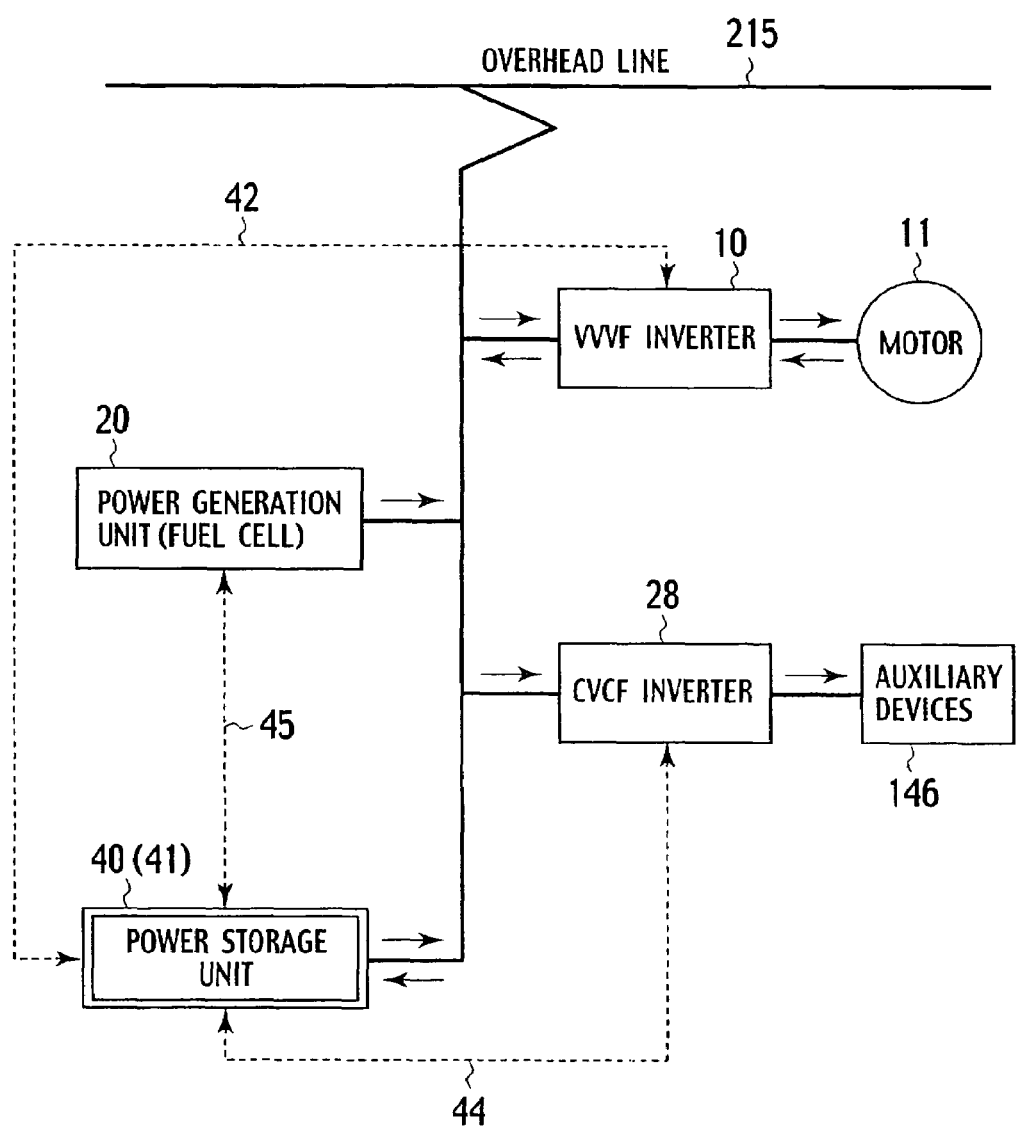
FIG. 12 is a block diagram showing information paths to and from a power management unit according to a fifth embodiment of the present invention.

The power management unit 41 according to the first embodiment is a discrete unit. The power management unit 41 may be incorporated in another unit. For example, FIG. 9 shows a second embodiment of the present invention in which the power management unit 41 is incorporated in a controller of the VVVF inverter 10, to centrally control the VVVF inverter 10, CVCF inverter 28, power storage unit 40, and power generation unit 20. FIG. 10 shows a third embodiment of the present invention in which the power management unit 41 is incorporated in a controller of the CVCF inverter 28, to centrally control the VVVF inverter 10, CVCF inverter 28, power storage unit 40, and power generation unit 20. FIG. 11 shows a fourth embodiment of the present invention in which the power management unit 41 is incorporated in a controller of the power generation unit 20, to centrally control the VVVF inverter 10, CVCF inverter 28, power storage unit 40, and power generation unit 20. FIG. 12 shows a fifth embodiment of the present invention in which the power management unit 41 is incorporated in a controller of the power storage unit 40, to centrally control the VVVF inverter 10, CVCF inverter 28, power storage unit 40, and power generation unit 20.

What is claimed is:

1. A control system for an electric motor car, comprising:
    a variable-voltage variable-frequency (VVVF) inverter configured to receive DC power from an overhead line or a third rail, convert the received DC power into AC power under variable-voltage, variable-frequency control, and supply the AC power to an AC motor;
    a constant-voltage constant-frequency (CVCF) inverter configured to receive the DC power and supply constant-voltage, constant-frequency power to auxiliary devices of the electric motor car;
    a power generation unit configured to supply power to the VVVF inverter and the CVCF inverter;
    a power storage unit configured to store power from the power generation unit and the VVVF inverter; and
    a power management unit configured to centrally control power consumption and power supply, the power management unit conducting:
        power consumption control when the electric motor car carries out a regenerative braking operation, so that the VVVF inverter converts regenerated AC power of the AC motor into DC power, and the power storage unit and the CVCF inverter store and consume the converted DC power;
        power supply control when the electric motor car carries out a power running operation, so that power from the power generation unit and the power storage unit and supplemental power thereof from the overhead line or the third rail are supplied to the VVVF inverter and the CVCF inverter; and
        power supply control when the electric motor car carries out a coasting operation, so that power from the power generation unit and the power storage unit and supplemental power thereof from the overhead line or the third rail are supplied to the CVCF inverter.

2. The control system of claim 1, wherein:
    the power management unit receives railroad information related to the electric motor car, and according to the received railroad information, issues a power running/braking instruction to the electric motor car so as to minimize power supply from the overhead line.

3. The control system of claim 1, wherein:
    the power management unit receives information related to a speed of the electric motor car, and if the information shows that the electric motor car is power-running at maximum output, activates the power generation unit and the power storage unit.

4. The control system of claim 1, wherein:
the power management unit receives information related to an input current from the overhead line, and if the input current is equal to or greater than a set value, activates the power generation unit and the power storage unit.

5. The control system of claim 1, wherein:
the power management unit calculates an output value of the AC motor, and if the output value is equal to or greater than a set value, activates the power generation unit and the power storage unit.

6. The control system of claim 1, wherein:
the power management unit receives information related to a voltage of the overhead line, and if the voltage is equal to or smaller than a set value, activates the power generation unit and the power storage unit.

7. The control system of claim 1, wherein:
the power management unit receives information related to a speed of the electric motor car, and if the speed information shows that the electric motor car is within a regenerative braking range, makes the power storage unit store power.

8. The control system of claim 1, wherein:
if power supplied from the overhead line or the third rail stops, the power management unit operates the VVVF inverter, the CVCF inverter, and the power storage unit and limits a load of the CVCF inverter to air conditioners and interior lights of the electric motor car.

9. The control system of claim 1, wherein the power storage unit comprises:
a D/D converter configured to convert DC power into DC power of a predetermined voltage; and
an electric double layer capacitor configured to store the DC power provided by the D/D converter.

10. The control system of any one of claims 1 to 9, wherein:
the power management unit is incorporated in a controller of the VVVF inverter.

11. The control system of any one of claims 1 to 9, wherein:
the power management unit is incorporated in a controller of the CVCF inverter.

12. The control system of any one of claims 1 to 9, wherein:
the power management unit is incorporated in a controller of the power generation unit.

13. The control system of any one of claims 1 to 9, wherein:
the power management unit is incorporated in a controller of the power storage unit.

* * * * *